Jan. 19, 1932.  H. EDWARDS  1,841,592
CONVEYER CHAIN
Filed Oct. 21, 1929
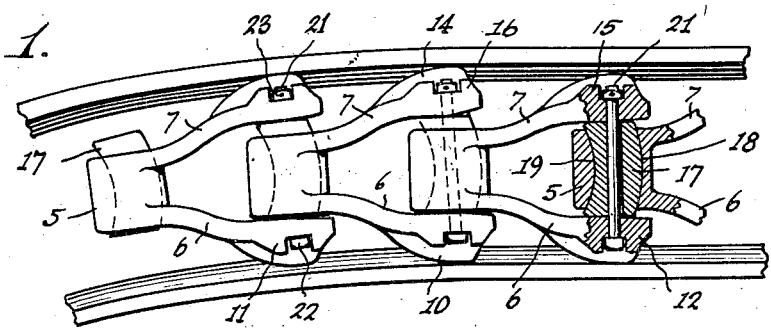
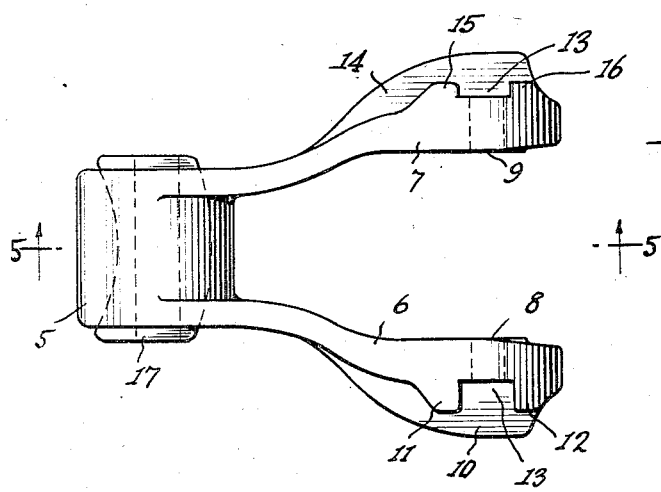
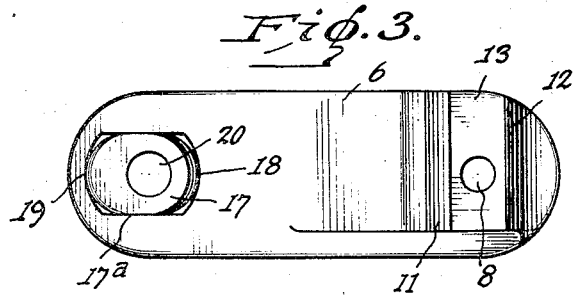
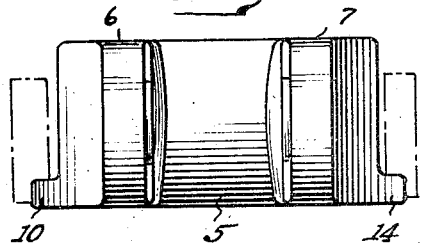
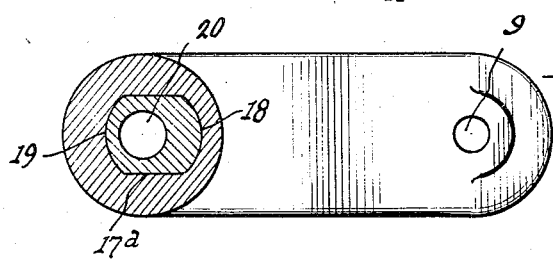
INVENTOR
*Hilding Edwards*
BY
*Victor J. Evans*
ATTORNEY Patented Jan. 19, 1932

1,841,592

UNITED STATES PATENT OFFICE

HILDING EDWARDS, OF NEW YORK, N. Y., ASSIGNOR TO VICTOR IRON WORKS, INC., OF NEW YORK, N. Y., A CORPORATION OF NEW YORK

CONVEYER CHAIN

Application filed October 21, 1929. Serial No. 401,217.

This invention relates to improvements in conveyer chains, and its leading object is to provide a conveyer chain which can be trained to operate in a trackway or path which is itself curved in a horizontal plane, so that special idlers and guides may be eliminated, and the links of the conveyer chain will have a radial swinging action on each other about the axis of the curve about which the chain is being driven, and, in the direction of the pivots connecting the links to each other.

A further object of the invention is the provision of a conveyer chain having a series of links pivoted to each other, to freely bend around the driving and idler pulleys, and also to curve during its movement, so as to follow curved trackways or courses, and without causing the links to bind at the pivots even at the extreme limit of the curve.

A still further object of the invention is the provision of a conveyer chain having a pivot sleeve constructed to permit the eye of the conveyer chain link to float radially thereon and to freely turn on the connecting pivot pin.

Yet another object is to enable a conveyer chain to be capable of flexing sideways, around corners, S-curves and the line, the chain links including an eye portion having a curved bearing recess therein, with oppositely diverging arms integral with the eye portion, a long connecting pin bearing being provided between the ends of the arms, and a pivot sleeve or bushing having parallel curved forward and rearward surfaces being positioned on the pin to receive the eye portion of the adjacent link between the outer ends of the arms.

Other objects and advantages of the invention will be hereinafter specifically pointed out, or will become apparent, as the specification proceeds.

With the above indicated objects in view, the invention resides in a certain novel construction and combination and arrangement of parts, clearly described in the following specification and fully illustrated in the accompanying drawings, which latter show an embodiment of the invention as at present preferred.

In the drawings:—

Fig. 1 is a top plan view of a series of links of the improved construction shown in a curved trackway.

Fig. 2 is a top plan view, on an enlarged scale of one of the links, showing the location of the pivot sleeve.

Fig. 3 is a side elevation of the link shown in Fig. 2.

Fig. 4 is an end view of the link shown in Figs. 2 and 3.

Fig. 5 is a longitudinal sectional view taken on line 5—5 of Fig. 2.

Referring to the accompanying drawings in detail 5 designates the eye portion of the improved conveyer chain link, and 6 and 7 the integral arms or jaws thereof.

The arm 6 is formed with a transverse hole 8 and the arm 7 is formed with a transverse hole 9. These two holes diverge from the eye portion, the ends of the arms being axially aligned, and the arms are spaced apart a distance slightly in excess of the width of the eye portion 5, so that the eye portion 5 of one link can shift between the jaws 6 and 7 of the companion chain link coupled thereto.

The arm or jaw 6 is also formed with a longitudinal reinforcing web 10, located on the outer side thereof, and with transverse reinforcing lugs 11 and 12, which are spaced apart on opposite sides of the transverse hole 8, and thus form a rectangular socket 13.

The arm or jaw 7 is similarly formed with a longitudinal reinforcing web 14, and with transverse reinforcing lugs 15 and 16, spaced apart from each on opposite sides of the hole 9 to provide a rectangular socket 13.

In each case the reinforcing web of the arm provides a stop at one end of the socket of the arm.

The eye portion 5 in this case does not have a straight hole, but is formed with a radially curved wall 17a to receive the bushing or pivot sleeve 17, which is formed with external radially curved parallel surfaces, providing a convex curved outer surface 18 on one side thereof and a concave curved surface 19 on the opposite side thereof.

This bushing or pivot sleeve 17 has a loose sliding fit in the radially curved hole of the eye portion 5, and is provided with a straight hole 20 extending therethrough which may be of uniform diameter or otherwise.

In assembling the approved conveyer chain, which consists of a series of similar links, the eye portion 5 is first supplied with one of the pivot sleeves 17, and then placed between the jaws 6 and 7, and the connecting pin 21 is driven into either hole 8 or hole 9 and thence through the central hole 20 of the bushing or pivot sleeve, and then into the opposite hole, either 8 or 9. The connecting pin is preferably provided with a square head 22 one on each end which fits into one of the rectangular sockets, while the other end is formed with a transverse hole through which a cotter pin 23 is driven, and thus locked in the opposite rectangular socket against displacement.

When assembled the eye portion 5 will shift on the bushing or pivot sleeve, and the latter will shift on the connecting pivot pin, while the links will hinge in both directions on both the pivot sleeve and the connecting pin, regardless of the particular position of the eye portion on the pivot sleeve.

Conveyer chains are usually provided in parallel and canvas or duck composition, rubber or leather belts are frequently mounted on these parallel chains, and driven through courses which are curved laterally of the direction of travel. The improved conveyer chain disclosed provides a connection between each pair of links, which permits either a single conveyer chain, or a pair of parallel conveyer chains, to operate around such a curved course, without being held to their path by expensive and complicated equipment.

The pivot sleeve permits each link to assume an angular relation to each other link, and to freely hinge in both directions. The pivot sleeve in no way weakens the hinge joint between the coupled chain links, and increases the freedom of movement of the hinge point. It also reduces the lateral thrusts of one link against the other, and thus aids in increasing the general efficiency of the conveyer chain, and the more economical use of the power applied to the conveyer.

Due to the flexibility of the radially curved pivot joint, the improved conveyer chain may be trained over loading and carrying courses in factories, warehouses, etc., which will permit of the use of less floor space and a more efficient organization of the service units associated with the conveyer.

The hereinbefore described construction admits of considerable modification without departing from the invention; therefore I do not wish to be limited to the precise arrangements shown and described, which are, as aforesaid, by way of illustration merely. In other words, the scope of the protection contemplated is to be taken solely from the appended claims, interpreted as broadly as is consistent with the prior art.

I claim as new:—

1. A conveyer chain consisting of a series of links, each link having a pair of spaced arms on one end provided with connecting pin bearings and with a lug on the opposite end provided with a bearing hole, the wall of which is curved concave on one side and curved convex on the other side, a sliding sleeve in each of said curved bearing holes, and a connecting pin extending through each of the pin bearings of the spaced arms and through the sleeve to pivotally couple the end of one link to the end of the next link, whereby each link will have radial sliding action on the adjacent links lateral to the plane of hinge movement.

2. A conveyer chain comprising a series of interconnected links, each link having at one end an eye portion formed with a hole which includes concavo-convex walls, said eye portion including a pair of integral arms having aligned apertures therein, an elongated connecting pin extending through said aligned apertures, an arcuate bushing having concavo-convex walls and being loosely mounted for axial movement on said connecting pin, said bushing extending through the hole of the eye portion of an adjoining link, whereby said eye portions are shiftable laterally on said arcuate bushings between said arms and said links are pivotally movable in different directions on said bushing and connecting pin, so that said series of interconnected links are adapted to define a curvilinear path during travel of the conveyer chain.

3. A conveyer chain comprising a series of like interconnected links, each link having at one end a narrow eye portion formed with a horizontal hole which includes concavo-convex front and rear walls and flat top and bottom walls, said eye portion including a pair of integral arms which diverge toward their outer ends, said arms having horizontally aligned apertures, an elongated connecting pin extending through said aligned apertures, an arcuate bushing having concavo-convex front and rear outer walls and flat top and bottom walls, said bushing loosely mounted for axial movement on said pin, said bushing extending through the horizontal hole of the narrow eye portion of an adjoining link, whereby said eye portions are shiftable laterally on said arcuate bushings between said arms and said links are pivotally movable in different directions on said bushing and connecting pin, so that said series of interconnected links are adapted to define a curvilinear path during travel of the conveyer chain.

4. A conveyer chain comprising a series of interconnected links, each link having at one end an eye portion formed with a concavo-convex hole and including a pair of integral arms which diverge toward their outer ends, a lower reinforcing web and front and rear vertical lugs at the outer side of the widely spaced portions of each of said arms, forming an angular bearing socket on each arm, said arms having horizontally aligned apertures, the outer ends of said connecting pin having retaining devices positioned in said angular bearing sockets, an arcuate bushing having concavo-convex front and rear outer portions and being loosely mounted on said pin, said bushing extending through the concavo-convex hole of the eye portion of an adjoining link, whereby said eye portions are shiftable laterally on said arcuate bushings between said arms and said links are pivotally movable in different directions on said bushing and connecting pin, so that said series of interconnected links are adapted to define a curvilinear path during travel of the conveyer chain.

5. A conveyer chain comprising a series of interconnected links, each link having at one end an eye portion formed with a horizontal hole which includes concavo-convex front and rear walls and flat top and bottom walls, said eye portion including a pair of integral arms, a lower reinforcing web and front and rear vertical lugs at the outer side of the widely spaced portions of each of said arms, forming an angular bearing socket on each arm, said arms having horizontally aligned apertures, an elongated connecting pin extending through said aligned apertures, the outer ends of said pin having retaining means positioned in said angular bearing sockets, an arcuate bushing having concavo-convex front and rear outer walls and flat top and bottom walls, said bushing loosely mounted for axial movement on said pin, said bushing extending through the horizontal hole of the eye portion of an adjoining link, whereby said eye portions are shiftable laterally on said arcuate bushings between said arms and said links are pivotally movable in different directions on said bushing and connecting pin, so that said series of interconnected links are adapted to define a curvilinear path during travel of the conveyer chain.

6. A conveyer chain comprising a series of interconnected links, each link having at one end a narrow eye portion formed with a horizontal hole which includes concavo-convex front and rear walls and flat top and bottom walls, said eye portion including a pair of integral arms which diverge toward their outer ends, means at the outer side of the widely spaced portions of said arms forming a bearing socket on each arm, said arms having horizontally aligned apertures, an elongated connecting pin extending through said aligned apertures, the outer ends of said pin having retaining means positioned in said bearing sockets, an arcuate bushing having concavo-convex front and rear outer walls and flat top and bottom walls, said bushing loosely mounted for axial movement on said connecting pin, said bushing extending through the horizontal hole of the narrow eye portion of an adjoining link, whereby said eye portions are shiftable laterally on said arcuate bushings between said arms and said links are pivotally movable in different directions on said bushing and connecting pin, so that said series of interconnected links are adapted to define a curvilinear path during travel of the conveyer chain.

In testimony whereof I hereby affix my signature.

HILDING EDWARDS.